(12) United States Patent
Fukui et al.

(10) Patent No.: US 6,398,270 B1
(45) Date of Patent: Jun. 4, 2002

(54) CORRUGATED PIPE JOINT (75) Inventors: Kouki Fukui; Hiroyuki Amatsutsu; Yasuhiro Kikumori, all of Osaka (JP)

(73) Assignee: Totaku Industries, Inc., Takatsuki (JP)

( * ) Notice: Subject to any disclaimer, the term of this patent is extended or adjusted under 35 U.S.C. 154(b) by 0 days.

(21) Appl. No.: 09/563,492

(22) Filed: May 3, 2000

(30) Foreign Application Priority Data

May 6, 1999 (JP) ............................................ 11-125663

(51) Int. Cl.[7] ............................ F16L 17/00; F16L 19/00
(52) U.S. Cl. ....................... 285/373; 285/335; 285/369; 285/372; 285/419; 285/420; 285/903
(58) Field of Search ................................. 285/373, 372, 285/335, 369, 903, 419, 420

(56) References Cited

U.S. PATENT DOCUMENTS

| 725,610 | A | * | 4/1903 | Wossoff | 285/373 |
|---|---|---|---|---|---|
| 2,690,193 | A | * | 9/1954 | Smith | 138/99 |
| 3,251,615 | A | * | 5/1966 | Short, III | 285/112 |
| 3,790,194 | A | * | 2/1974 | Kimberley | 285/373 |
| 3,897,090 | A | * | 7/1975 | Maroschak | 285/260 |
| 4,273,367 | A | * | 6/1981 | Keeney et al. | 285/419 |
| 4,417,755 | A | * | 11/1983 | Gittleman | 285/373 |
| 4,443,031 | A | * | 4/1984 | Borsh et al. | 285/419 |
| 4,652,023 | A | * | 3/1987 | Timmons | 285/93 |
| 4,768,813 | A | * | 9/1988 | Timmons | 285/373 |
| 4,795,197 | A | * | 1/1989 | Kaminski et al. | 285/12 |
| 5,058,931 | A | * | 10/1991 | Bowsher | 285/112 |
| 5,121,946 | A | * | 6/1992 | Jardine | 285/15 |
| 5,161,836 | A | * | 11/1992 | McKinnon | 285/373 |
| 5,246,257 | A | * | 9/1993 | Kojima et al. | 285/112 |
| 5,458,380 | A | * | 10/1995 | Kanao | 285/369 |
| 5,950,683 | A | * | 9/1999 | Henderson et al. | 138/99 |
| 6,070,914 | A | * | 6/2000 | Schmidt | 285/112 |
| 6,076,861 | A | * | 6/2000 | Ikeda | 285/112 |
| 6,131,957 | A | * | 10/2000 | Saito et al. | 285/133.21 |
| 6,305,719 | B1 | * | 10/2001 | Smith, Jr. et al. | 285/15 |

FOREIGN PATENT DOCUMENTS

| DD | 004997 A | * | 1/1889 | 285/373 |
|---|---|---|---|---|
| FR | 1411192 A | * | 8/1965 | 285/373 |

* cited by examiner

Primary Examiner—Katherine A. Matecki
Assistant Examiner—Carlos Lugo
(74) Attorney, Agent, or Firm—McGinn & Gibb, PLLC (57) ABSTRACT A corrugated pipe joint for coupling corrugated pipes includes at least two joint components, each of which includes a joint main body made of a synthetic resin and including an arc-shaped portion and tightening projecting edges which are outwardly projected from circumferential end portions of said arc-shaped portion in a radial direction of the corrugated pipes to be coupled, and a watertightness-implementing packing made of an elastic material and assembled with the joint main body, the watertightness-implementing packing including an arc-shaped portion and flange edges projecting outwardly from circumferential end portions of the arc-shaped portion in the radial direction.

12 Claims, 12 Drawing Sheets

FIG.11

CORRUGATED PIPE JOINT

BACKGROUND OF THE INVENTION

1. Field of the Invention

The present invention relates to a corrugated pipe joint suitable for connecting and coupling in a watertight fashion two synthetic resin corrugated pipes whose outer circumferential surfaces are formed into a concave-convex corrugated shape.

2. Description of the Related Art

Conventionally, various types of corrugated pipe joints like one described above have been manufactured and used. These are generally classified into two types in terms of circumferential surface configuration; a joint whose main body is formed into a hollow cylinder without a concave-convex corrugation and a joint whose main body is provided with concave-convex corrugations corresponding to the concave-convex corrugations of pipe bodies to be connected to each other. In addition, the joints are also classified into two types in terms of body construction; a joint whose main body is formed into a hollow cylinder and a joint whose main body is formed into a bisected semi-cylindrical configuration.

For example, Japanese Patent Unexamined Publication No. Hei. 6-44334 disclose a known joint in which a joint main body is formed into a bisected semi-cylindrical configuration as with the latter construction and in which the configuration of the joint main body is formed into something like a concave-convex spiral shape corresponding to the concave-convex spiral corrugations of pipe bodies that are to be connected together.

In the joint for corrugated spiral pipes disclosed in the publication, a seal member is prepared separately from the joint main body which is externally formed into substantially a concave-convex spiral configuration which coincides with the concave-convex spiral configuration of the joint main body and is internally formed into a concave-convex spiral configuration which corresponds to the concave-convex spiral corrugations of the pipes to be connected together. The seal member is then fitted in the joint main body. The joint main bodies each incorporating therein the seal member are then disposed on a portion where the two pipes are connected end-to-end to each other from above and below, respectively, so as to cover the butted portion and thereafter the joint main bodies are secured to each other by tightening respective confronting projecting edges thereof together with tightening bolts and nuts via bolt holes formed in the projecting edges.

With the conventional corrugated pipe joint, however, as described above, the joint main body is substantially formed into the concave-convex spiral configuration, the seal member is prepared which comprises the concave-convex spiral external configuration coinciding with the concave-convex spiral configuration of the joint main body and the concave-convex spiral internal configuration coinciding with the concave-convex spiral configuration of the pipe bodies to be connected together, and these joint main bodies and seal members are prepared in a pair, respectively and are then disposed so as to confront each other for use. Due to this construction it is found difficult to tightly pressure contact and join confronting concave-convex corrugated edges of the seal members along the full length thereof, and therefore there is caused a problem that a slight amount of water is liable to leak out or penetrate in through the pressure contact surfaces of the seal members. In addition, it is also difficult from a viewpoint of molding accuracy to join the seal members and the pipe bodies in a watertight fashion in such a manner as to maintain watertightness along the full circumference thereof in a circumferential direction, and therefore there is also caused a problem that it is difficult to securely prevent the leakage or penetration of a slight amount of water in the circumferential direction.

SUMMARY OF THE INVENTION

With a view to solving the problems inherent in the conventional known corrugated pipe joint assemblies described above, an object of the present invention is to provide a corrugated pipe joint which can securely maintain the watertightness between joint areas of joint main bodies and a watertight state in a circumferential direction to thereby eliminate any risk of leakage and penetration of water without a complicated construction.

To describe a construction provided by the present invention to attain the aforesaid object using reference numerals that are to be used in describing embodiments of the invention, there is provided a corrugated pipe joint comprising a joint main body 1 of a synthetic resin comprising in turn tightening projecting edges 12, 12 projecting outwardly from the circumferential end portions of an arc-like portion 11 in a radial direction and a watertightness-implementing packing 2 of an elastic material comprising in turn flange edges 22, 22 projecting outwardly from the circumferentially end portions of an arc-like portion 21 in the radial direction wherein engagement projections 17, 17 are formed on an inner circumferential surface of each of axial end portions b, b of the joint main body for mesh engagement with a root portion of a corrugated pipe, wherein elongated projections 14 and tightening bolt holes 16 are formed in a surface side of the projecting edges 12, 12, the elongated projections 14 being formed in such a manner as to-extend along an axial direction of the joint main body, the tightening bolt holes 16 being formed outwardly of the elongated projections 14, wherein depressed grooves 24 are formed in a back side of the flange edges 22, 22 in such a manner as to extend along the axial direction for the elongated projections 14 on the joint main body 1 to fit therein, and wherein a surface-side portion of the depressed groove 24 projects an appropriate thickness o toward the surface side beyond the surface of the projecting edge 12, 12 on the joint main body 1.

In addition, the above-mentioned object can also be achieved by a corrugated pipe joint for coupling corrugated pipes, according to the present invention, includes at least two joint components. Each of the joint components comprises a joint main body (1) made of a synthetic resin and a watertightness-implementing packing (2) made of an elastic material and assembled with the joint main body (1). The joint main body (1) includes an arc-shaped portion (11) and tightening projecting edges (12, 12) which are outwardly projected from the circumferential end portions of the arc-shaped portion (11) in a radial direction of the corrugated pipes to be coupled. Engagement projections (17), (17) are formed on an inner circumferential surface of each of the axial end portions so as to be engageable with a root portion of one of the corrugated pipes. Axially elongated projections (14) and tightening bolt holes (16, 16) are formed on each of the tightening projecting edges (12, 12). The watertightness-implementing packing (2) includes an arc-shaped portion (21) and flange edges (22), (22) projecting from the circumferentially end portions of the arc-like portion (21) in the radial direction. Axially extending depressed grooves (24) are formed in back sides of flange edges (22, 22) so ads to be fittingly engageable with the elongated projections (14) on the joint main body (1) respectively. Further, when the at least two joint components are coupled with one another, a surface portion of the flange edge which is disposed at a front side opposed to the depressed groove and is disposed closest to the adjacent joint component is closer to the adjacent joint component by a predetermined distance than a surface portion of the projecting edge of the joint main body which is closest to the adjacent joint component.

In embodying the corrugated pipe joint constructed as described above, the joint main body 1 is formed into a bisected half semi-circular arc-like body and the respective bisected semi-circular arc-like portions 11 are embodied as being formed slightly smaller than the semi-circle. Alternatively, the joint main body 1 may be embodied as a trisected circular body which is formed slightly smaller than one third of a circle. The joint main body 1 may be formed as a quadrisected body as required.

In addition, in a case where the concave-convex corrugations of corrugated pipes to be connected are spiral corrugations, the invention is carried out such that the engagement projections 17, 17 provided at the axial end portions b, b of the joint main body 1 are formed so as to follow the spiral direction so that they properly mesh with root portions of the corrugated spiral pipes, and on the contrary, in a case where corrugated pipes to be connected are concave-convex annular corrugated pipes, the invention is carried out such that the engagement projections are formed so as to follow the annular direction so that they properly mesh with root portions of the concave-convex annular corrugated pipes.

While there is no special limitation to synthetic resin for use for formation of the joint main body 1 of the invention, synthetic resins are preferable including polyolefin plastic such as polyethylene and polypropylene, thermoplastic rigid resin material such as polyvinyl chloride and FRP which is a resin material reinforced with glass fiber, and it is preferable in particular to select for use materials which are resistant to aging and superior in tensile load bearing capacity. In addition, not only natural and synthetic rubber but also an elastic flexible synthetic resin material can be used for the watertightness-implementing packing 2. In addition, the joint main body 1 and the watertightness-implementing packing 2 may be formed separately and thereafter bonded together as an integrated unit. As a mode for carrying out the invention, the joint main body 1 and the packing may be fitted together when in use.

DETAILED DESCRIPTION OF THE PREFERRED EMBODIMENTS

Hereinafter preferred embodiments of a corrugated pipe joint according to the present invention will be explained.

Figure 1:
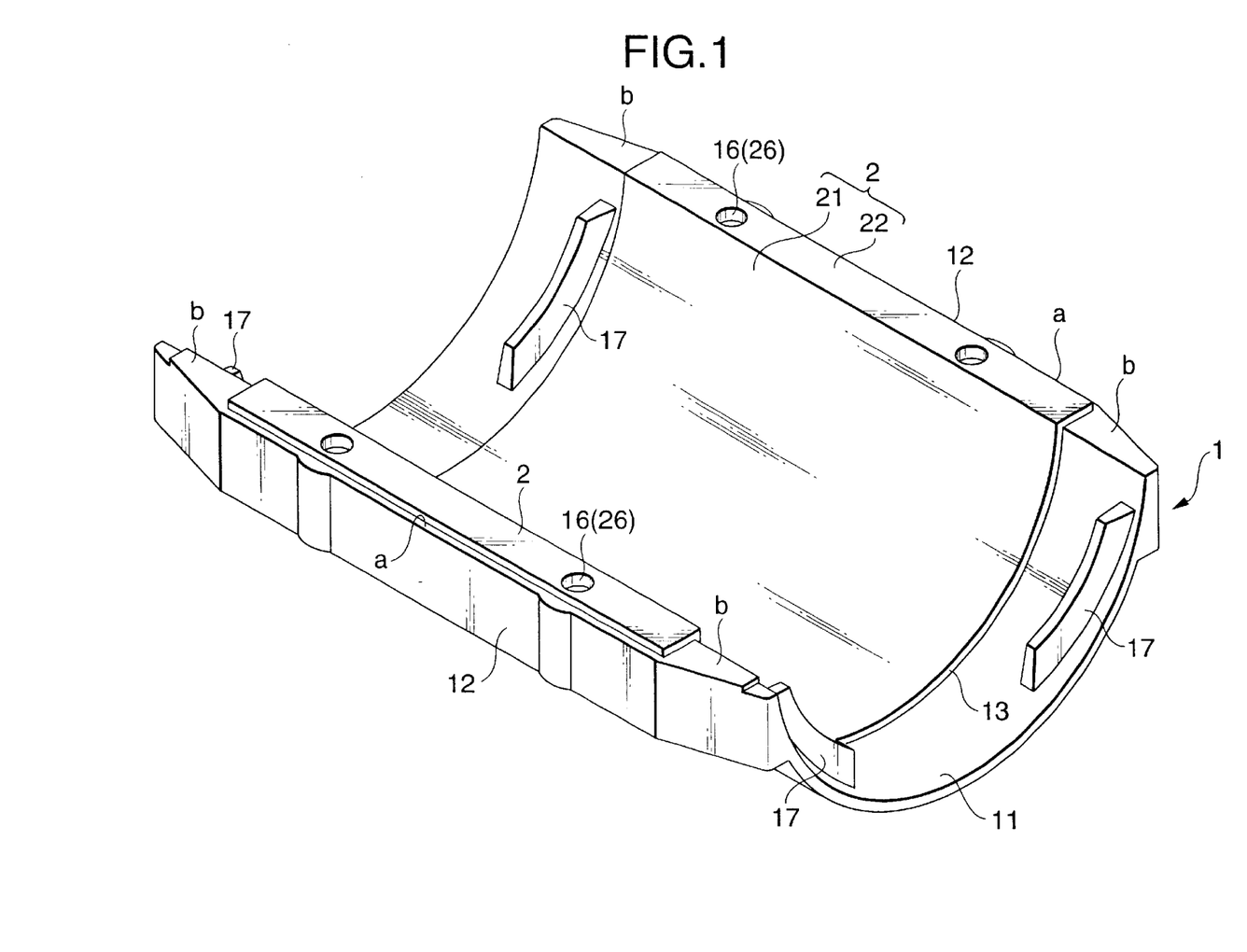
FIG. 1 is a perspective view of a corrugated spiral pipe joint which is formed as a bisected body.
Figure 2:
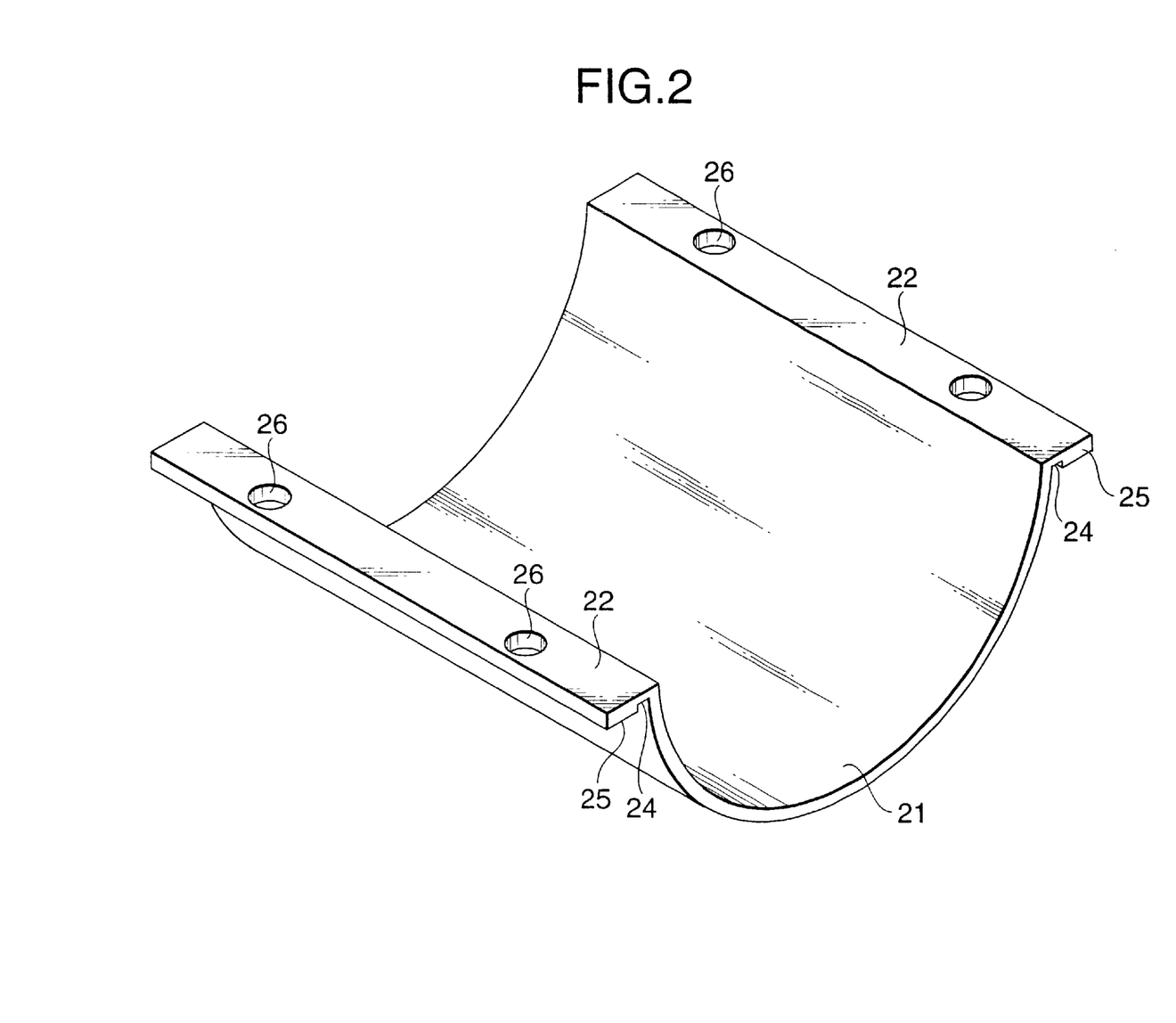
FIG. 2 is a perspective view of a packing constituting the corrugated spiral pipe joint.
Figure 3:
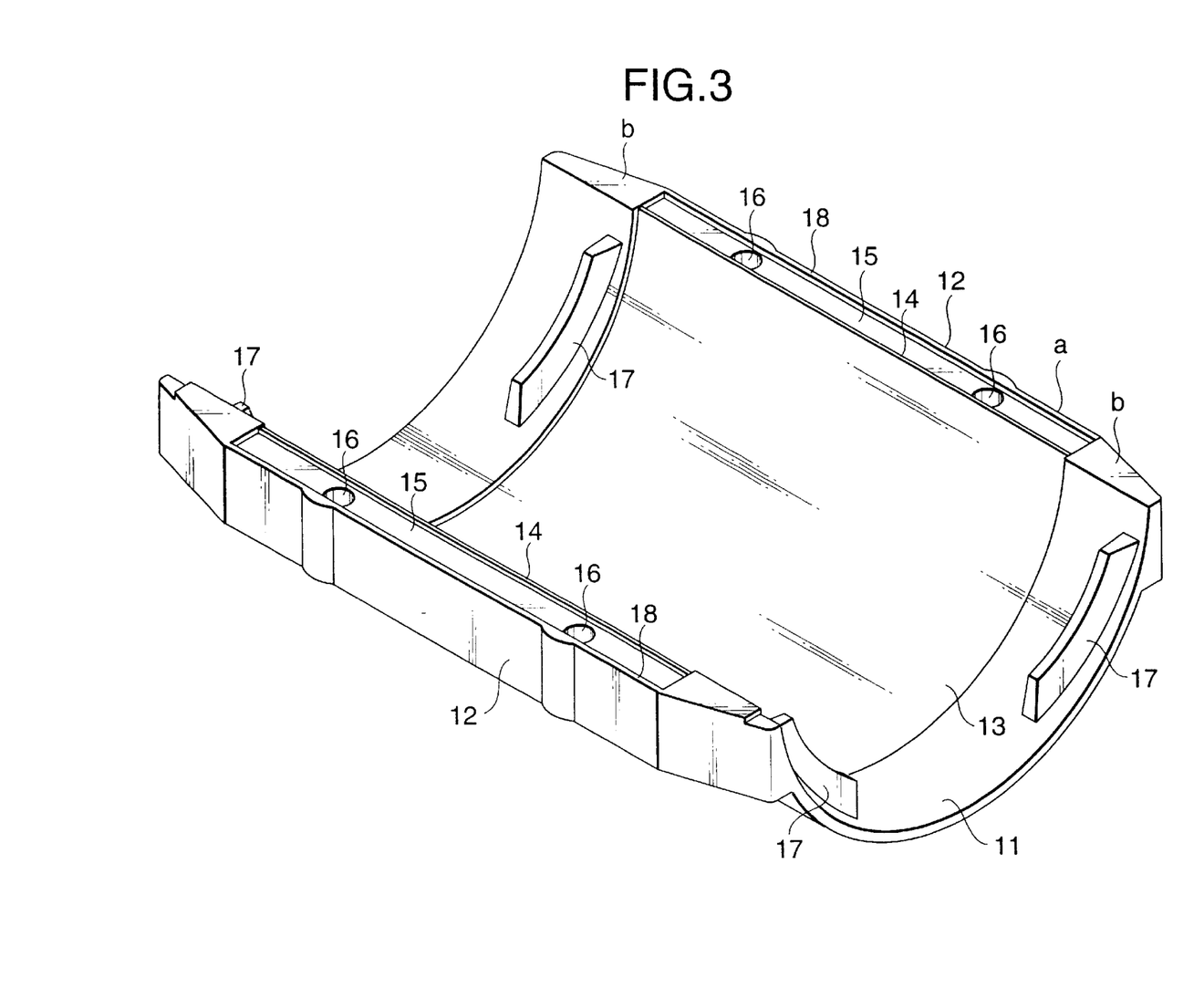
FIG. 3 is a perspective view of a joint main body constituting the corrugated spiral pipe joint.
Figure 4:
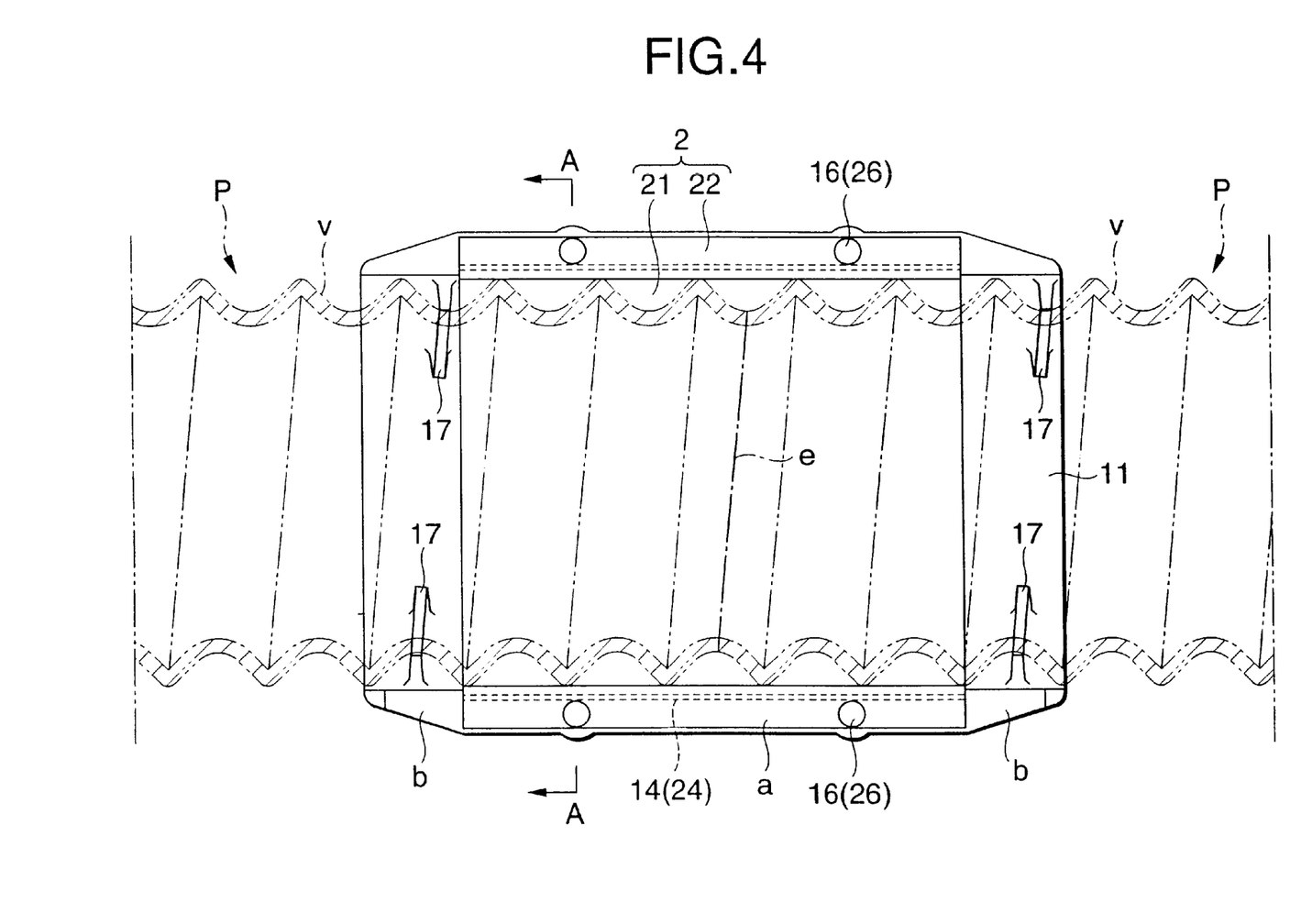
FIG. 4 is a plan view showing a relationship between the joint and pipe bodies.
Figure 5:
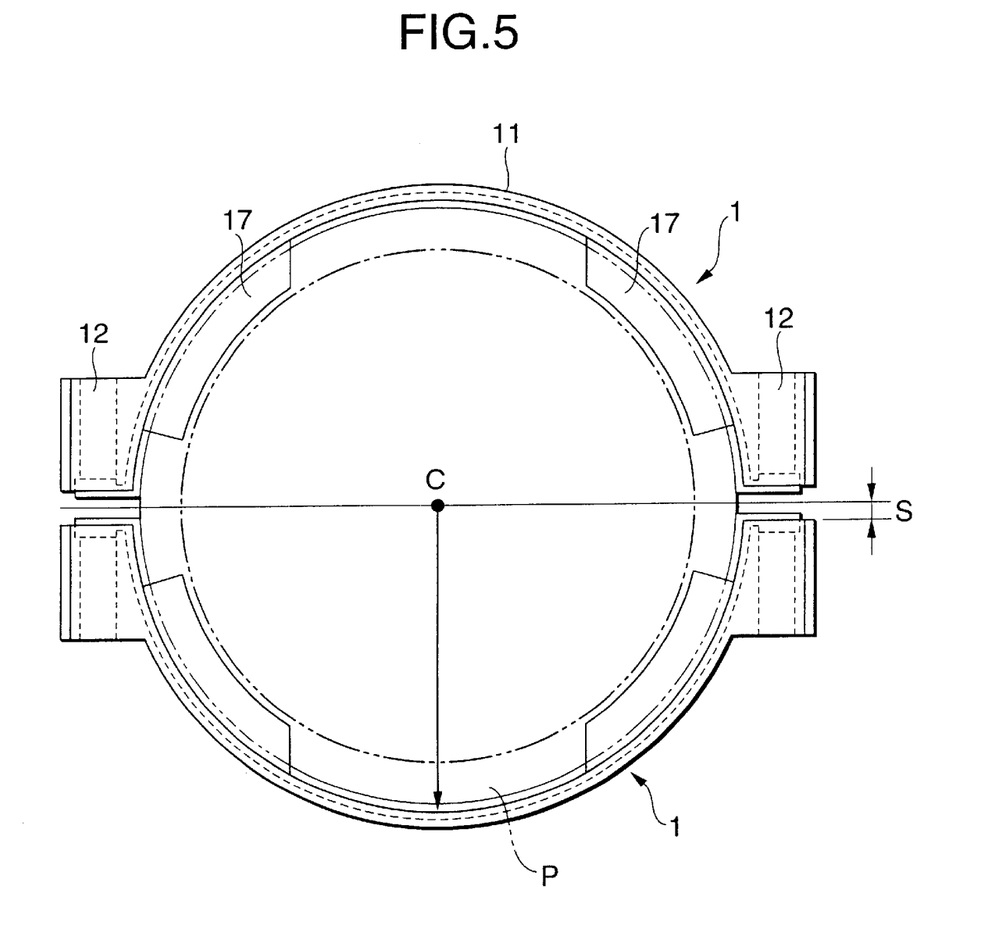
FIG. 5 is a side view showing the relationship between the joint and the pipe bodies.
Figure 6:
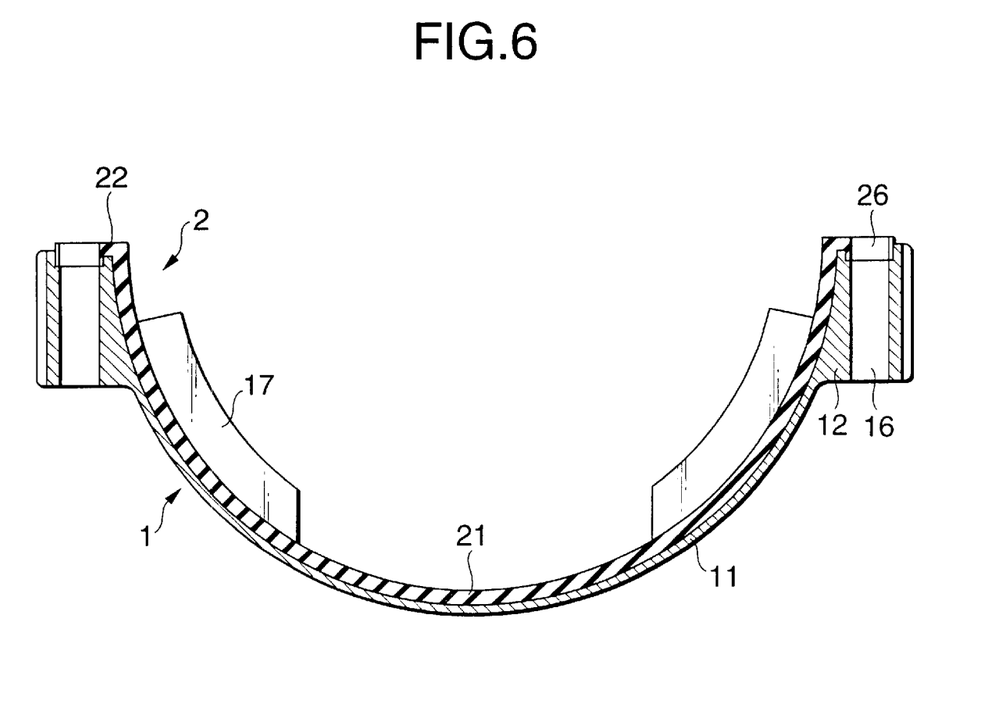
FIG. 6 is a cross-sectional view taken along the line A—A of FIG. 4.
Figure 7:
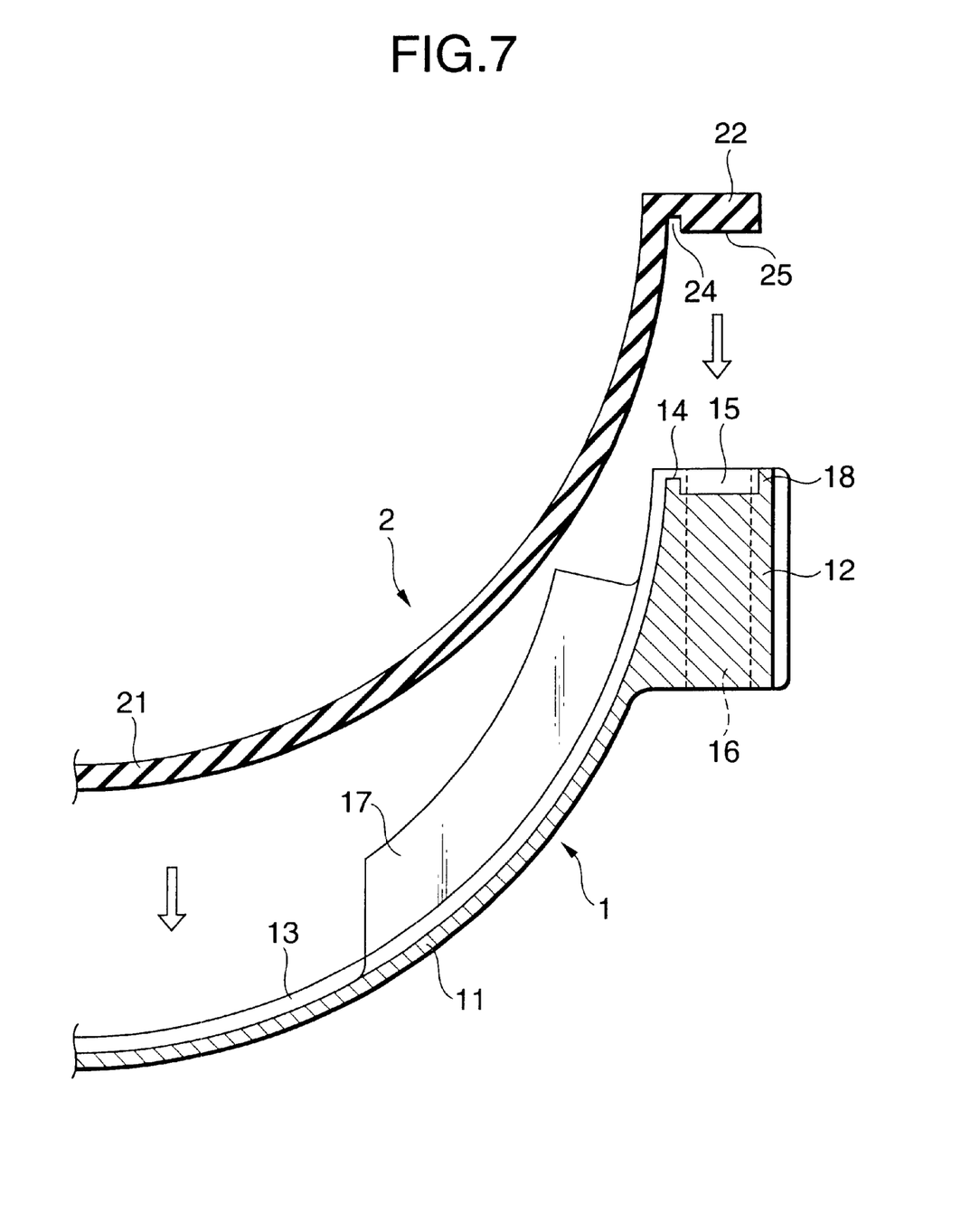
FIG. 7 is a partial cross-sectional view showing a state in which the packing is separated from the joint main body.
Figure 8:
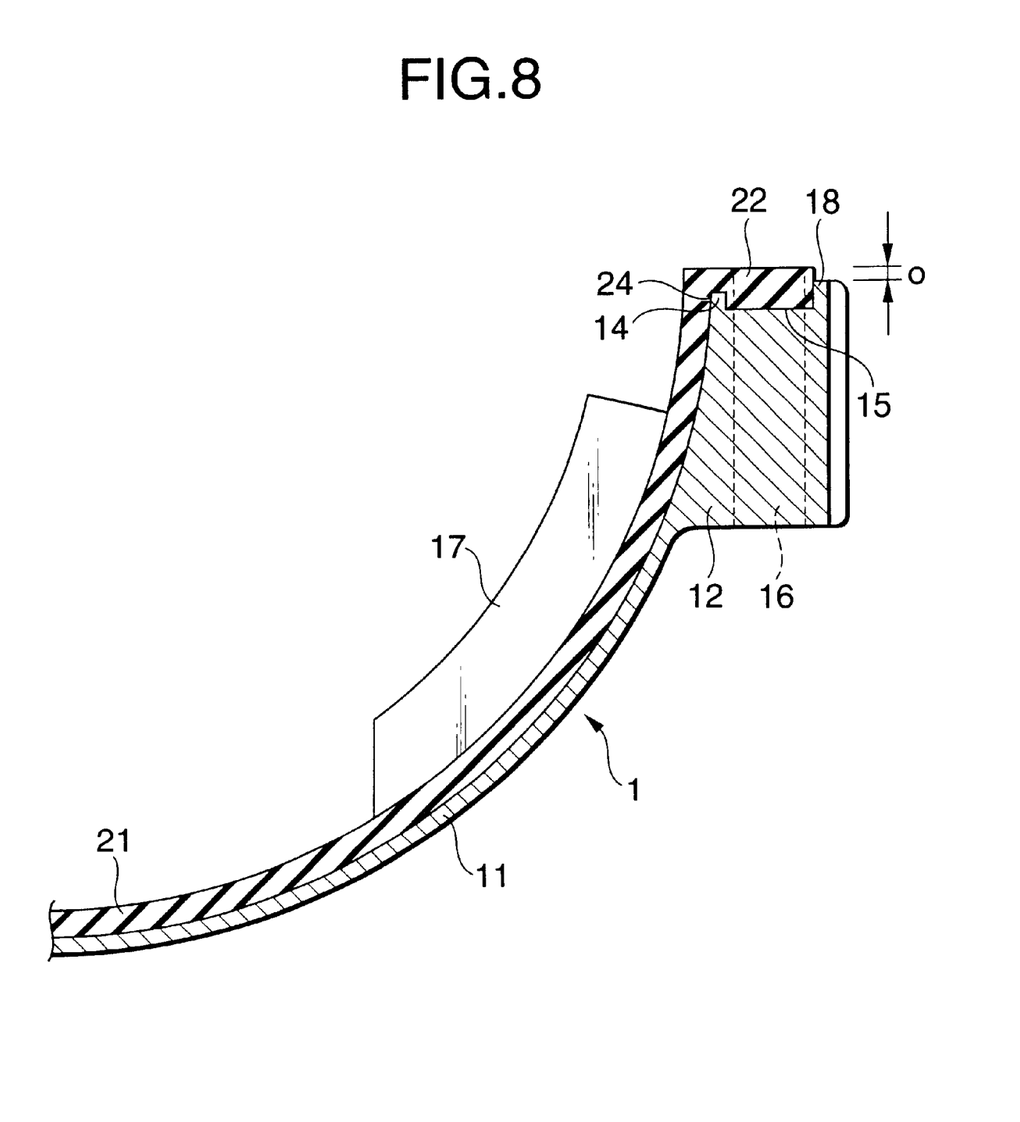
FIG. 8 is a partial cross-sectional view showing a state in which the packing is attached to the joint main body.

Referring to the accompanying drawings, an embodiment of the invention will be described below. FIGS. 1 to 8 are drawings showing a first embodiment of a corrugated pipe joint according to the invention. FIG. 1 is a perspective view showing an internal configuration of a bisected joint, FIGS. 2 and 3 are perspective views showing a packing and a joint main body, respectively, as a single unit, and FIG. 4 is a plan view showing a relationship between the corrugated pipe joint and pipe bodies. In addition, FIG. 5 is a side view for explaining the configuration of the joint, FIG. 6 is a cross-sectional view taken along the line A—A of FIG. 4, and FIGS. 7 and 8 are explanatory views explaining a relationship between the packing and the joint main body.

A joint illustrated in this embodiment is a joint for a concave-convex corrugated spiral pipe. A joint main body 1 is a bisected body resulting when a cylindrical body is bisected vertically, and as shown in FIG. 1 and FIGS. 3 to 5, the joint main body 1 is substantially rectangular as viewed from the top, whereas it is substantially semi-circular as viewed from the side. As seen in FIGS. 5 and 6, the joint main body 1 is a molded single article of glass filled polypropylene resin comprising integrally tightening projecting edges 12, 12 projecting outwardly from the circumferential end portions of the semi-circular arc-like portion 11 in the radial direction and having a tightening distance vertically extending substantially one third the height of the semi-circular arc.

Engagement projections (17, 17) are formed on inner circumferential surfaces of axial end portions (b, b) of the joint main body (1), two (2) on each end portion, in such a manner as to inclined toward a spiral direction of concave-convex corrugated spiral pipes (P, P) that are to be connected to each other so that the engagement projections properly mesh engage with root portions (v) of the corrugated spiral pipes. An intermediate portion (a) of the joint main body (1) between these end portions (b, b) are formed as a depressed fitting portions (13) needed to allow a packing (2) to be fitted therein by lowering a relevant portion of the inner circumferential surface of the joint main body (1) corresponding to the intermediate portion thereof. Elongated projections (14) are formed on cut surfaces of the projecting edges (12, 12) which are continuous with the depressed fitting portion (13) along the inner circumferential surface of the depressed fitting potion 13 in such a manner as to project toward a direction of the cut surface (upward in FIG. 5), and depressed portions (15), which are made lower than the cut surface, are formed outwardly of the elongated projections (14) (in transversely directions in FIG. 5). Tightening bolt holes (16, 16) are formed in two positions along the longitudinal length of the depressed portions 15, respectively for tightening upper and lower joint main bodies (1, 1). The drawings showing the first embodiment show rising ribs (18) as being formed outwardly of the depressed portions (15).

As shown in FIG. 5, the joint main body 1 is formed into an arc-like configuration which is slightly short, by a distance s as shown in the figure, of a bisecting line extending along a bisected surface which passes through a center c of the bisected circle. This construction is intended to transmit a strong tightening force to the whole circumference.

The watertightness-implementing packing 2 is a single unit which is generally formed into an integral body of an elastic material such as rubber and flexible synthetic resin. As shown in FIG. 2 and the other drawings, a main part thereof comprises an arc-like portion 21 which is square when viewed from the top and is substantially semi-circular when viewed from the side and substantially flat flange edges 22, 22 projecting outwardly in a radial direction from the circumferentially end portions of the arc-like portion.

The axial length of the watertightness-implementing packing 2 is such that the packing just fits in the depressed fitting portion 13 of the joint main body 1, and the thickness thereof is made thicker than the depth of the depressed fitting portion 13, whereby the packing projects a suitable thickness or distance inwardly of the joint main body 1 from the depressed fitting portion 13. In addition, the flange edges 22, 22 each comprises a depressed groove 24 in which the elongated projection 14 is fitted and a thicker portion 25 formed outwardly of the depressed groove 24 for abutment with the depressed portion 15, and bolt through holes 26, 26 or notched holes which are of U-shape when viewed from the top are formed in positions corresponding to the tightening bolt holes 16, 16 formed in the joint main body 1.

The watertightness-implementing packing 2 is constructed such that the surface portion of the depressed groove 24 in which the elongated projection 14 on the joint main body 1 is allowed to fit projects a suitable thickness or distance o toward the surface side beyond the surface of the projecting edge 12 of the joint main body 1, or, in the embodiment, the surface of the rib 18 provided outwardly of the depressed portion 15 or the surface of the end portion b, b, as shown in an enlarged fashion in FIG. 8, in a state in which the watertightness-implementing packing 2 is attached to the joint main body 1 without being compressed and tightened.

Figure 12:
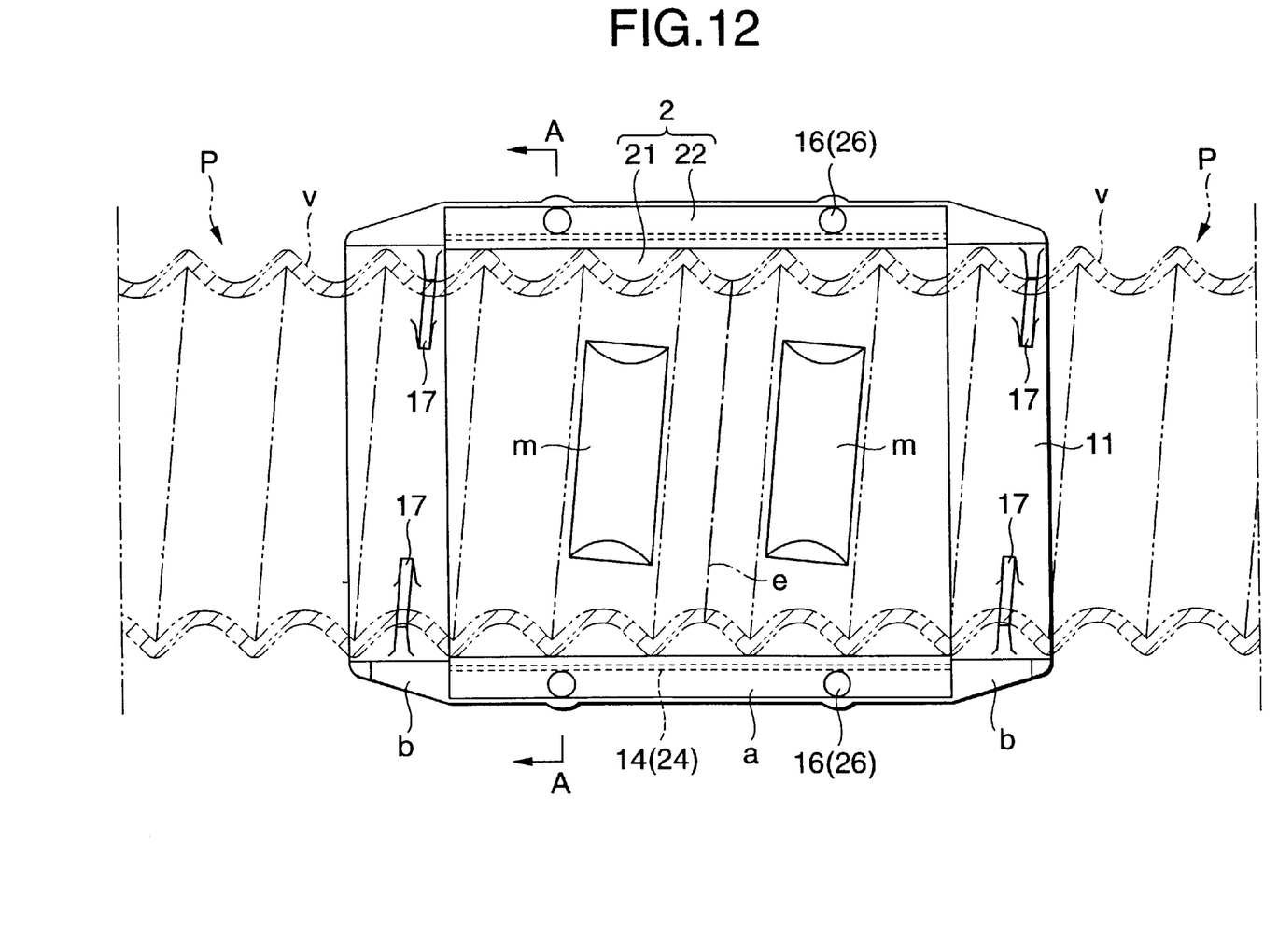
FIG. 12 is a plan view showing a portion of a concave-convex corrugated annular pipe joint corresponding to that shown in FIG. 4.

When using the corrugated pipe joint constructed as described above, one of the bisected joints is disposed at a predetermined position in which the packing 2 is attached to the joint main body 1 using an adhesive or a pressure sensitive adhesive double coated tape, or by allowing the packing to be fitted in the depressed fitting portion 13 formed in the joint main body 1 as in the case with this aforesaid embodiment, or using any other suitable means, and as shown in FIGS. 4 and 12, two pipe bodies (P, P) which are to be connected together are placed on the joint so disposed in such a manner that cut end faces (e) of the two pipe bodies are butted and that the engagement projections (17, 17) of the joint main body 1 properly mesh engage with root portions (v, v) of the pipe bodies. Then, waterstop elements (m, m) are disposed on the two pipe bodies (P, P) in such a manner as to fill the root portions, and then, as shown in FIG. 5, the other bisected joint is disposed on the pipe bodies from above in such a manner as to confront the lower joint, whereupon the projecting edges (12, 12) are tightened and secured together with bolts via the tightening bold holes (16, 16).

At this time, when the bolts are tightened, the projecting edges 12, 12 are caused to approach each other, and the waterstop elements m, m and the arc-like portions 21, 21 of the packings 2, 2 compress the full circumference of the top portions of the spiral corrugations of the pipe bodies P, P. At the same time as this happens, the surface portions of the depressed grooves 24, 24 of the packings 2, 2 are brought into abutment with each other. When the bolts are further tightened from this state, the abutment portions of the depressed grooves 24, 24 are compressed strongly and concentratedly by the elongated projections 14, 14 which fit in the depressed grooves 24, 24, whereby water can securely be stopped.

Thus, while the present invention has been described heretofore with respect to the representative embodiment, the invention is not always limited to the illustrative embodiment. For instance, on top of the bisected joint main body 1 as described above, trisected or quadrisected joint main bodies may be used so as to be applied to a large diameter pipe from three or four directions around the pipe bodies.

Figure 9:
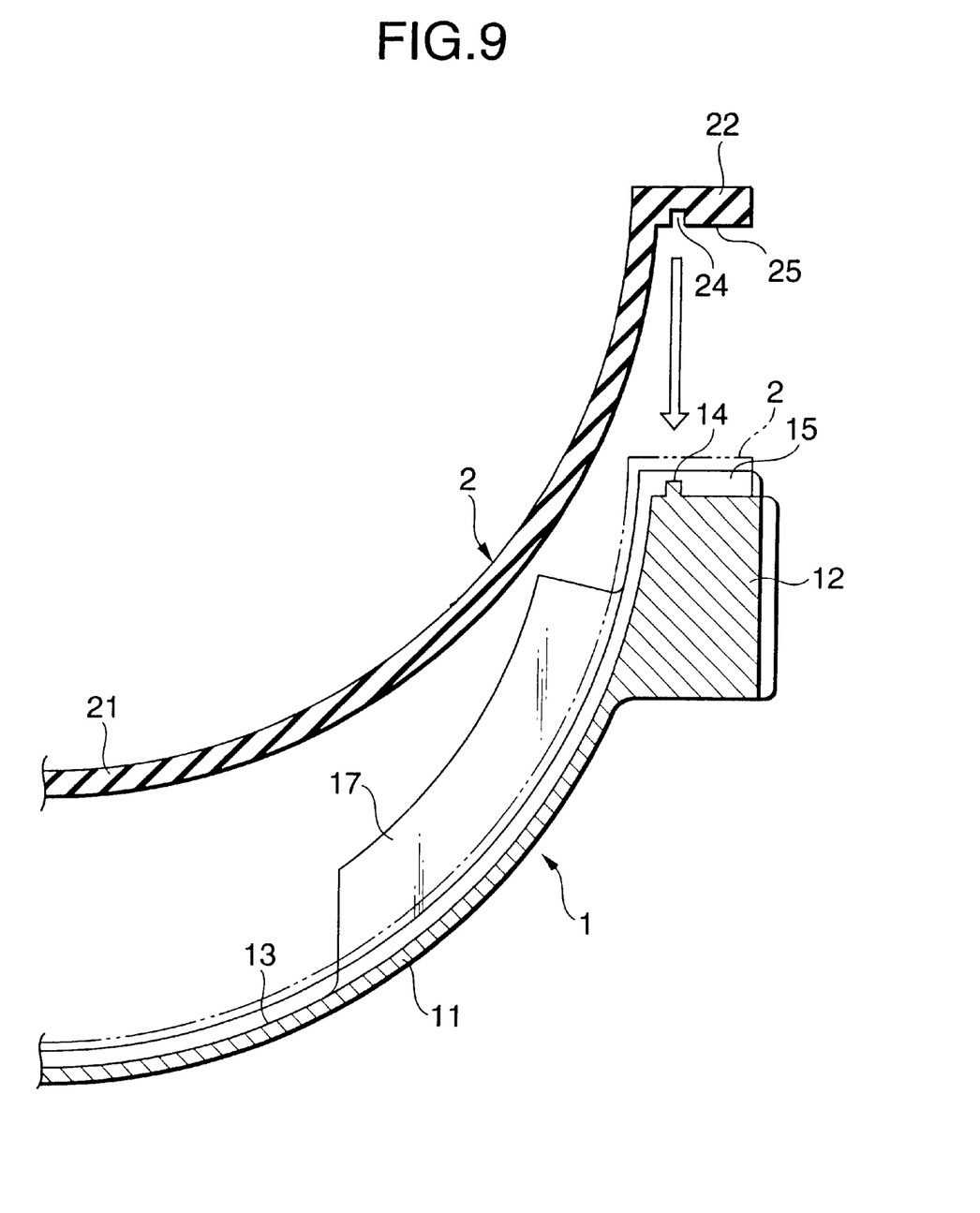
FIG. 9 is a partial cross-sectional view showing an elongated projection on a joint main body according to another embodiment.

In addition, the elongated projection 14 formed on the joint main body 1 may be formed at a position slightly outward from the inner surface of the depressed fitting portion 13, as shown in FIG. 9 which shows a main part of such a construction. Alternatively, the present invention may be carried out with the depressed fitting portion 13 described in the previous embodiment being omitted.

Figure 10:
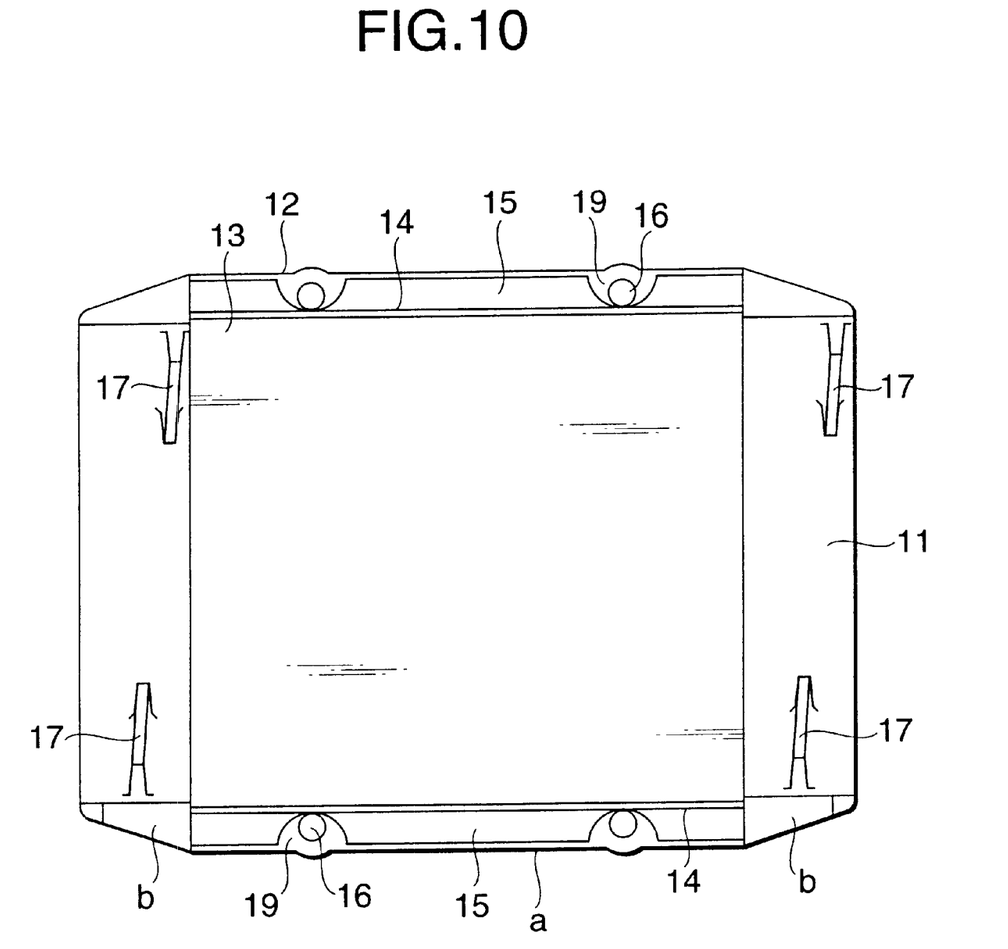
FIG. 10 is a plan view showing a joint main body of a corrugated spiral joint according to another embodiment.
Figure 11:
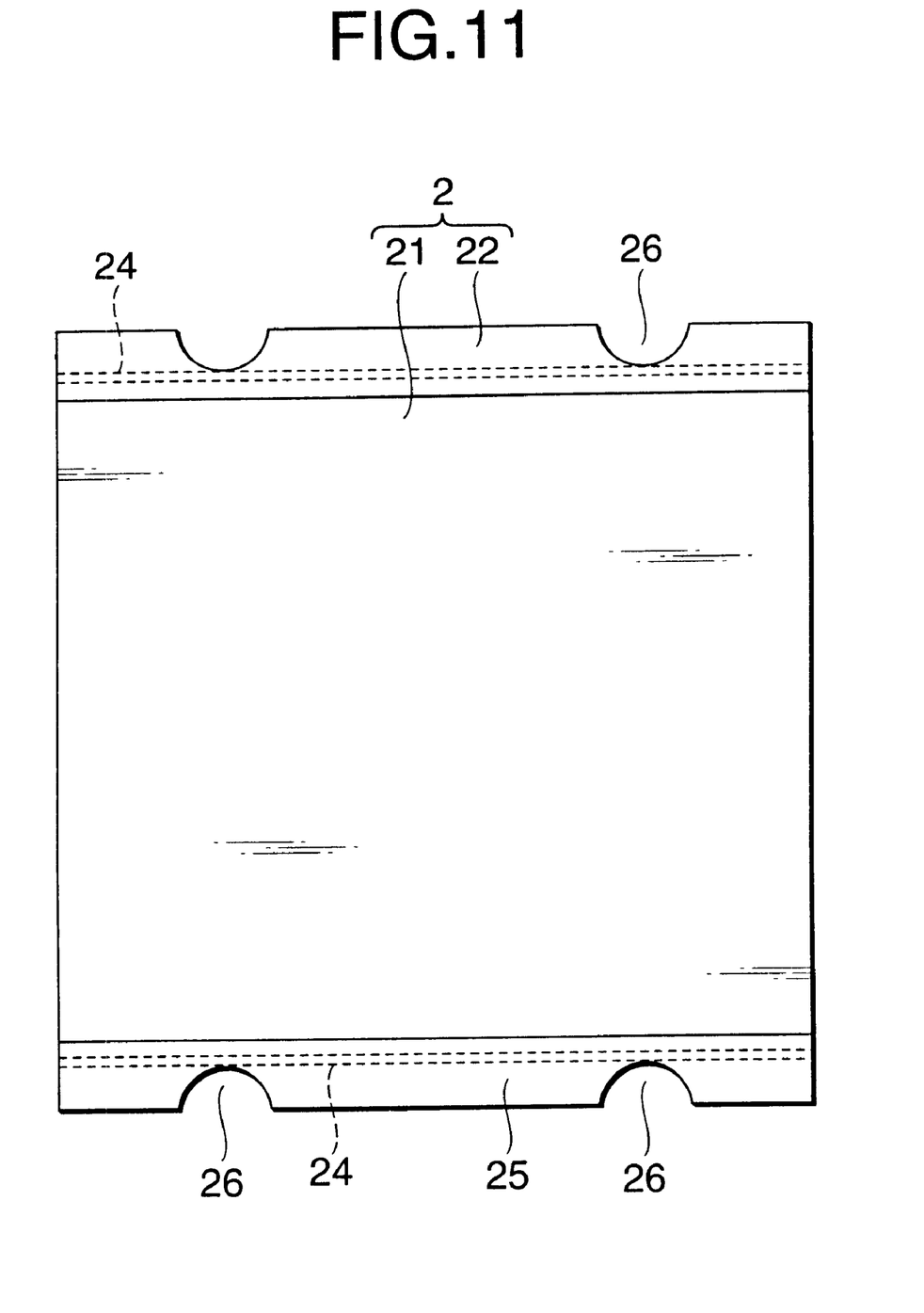
FIG. 11 is a plan view showing a packing for use with the joint main body of FIG. 10.

Furthermore, as shown in FIGS. 10 and 11, the present invention may be carried out such that portions 19 surround the tightening bolt holes 16 formed in the joint main body 1 are formed to be taller than the depressed portion 15 or as tall as the end portions b, b as with this embodiment, and that as seen in FIG. 11, notched holes 26 corresponding to the portions 19 surrounding the bolts holes are formed in the flange edges 22 of the packing 2. In this case, too, the surface portion of the depressed groove 24 in which the elongated projection 14 fits is constructed so as to project the appropriate thickness or predetermined distance o toward the surface side beyond the surface of the portions 19 surrounding the bolt holes.

Both the embodiments described above are intended for concave-convex corrugated spiral pipes, but a joint shown in FIG. 12 is constructed as a point for concave-convex corrugated annular pipes. A joint main body 1 of this embodiment is also a vertically bisected body as with the previous embodiments. This joint main body is, however, diferent from the previous one in that engagement projections 17, 17 formed so as to project from the inner circumferential surface of axial end portions b, b are formed in such a manner as to project toward an annular direction so that the engagement projections can properly mesh engage with annular root portions v of concave-convex corrugated annular pipes P, P to be connected together. The remaining portions of this embodiment adopt the construction used in the first embodiment.

The present invention may be carried out with both the concave-convex corrugated spiral pipes and concave-convex corrugated annular pipes, and in addition to the embodiments described heretofore, the present invention may be modified suitably without departing from the scope of the invention in which the aforesaid constituent requirements are provided, the object of the invention is attained and effects are provided as will be described below.

As is clear from the description made heretofore, the corrugated pipe joint of the invention is an axially bisected body, and the engagement projections are formed on the inner surfaces of the end portions b, b of the joint main body comprising the tightening projecting edges in such a manner as to project therefrom so as to be brought into mesh engagement with the root portions of corrugated pipes to thereby prevent the axial dislocation of the pipe bodies. The packing member comprising flange edges adapted to be held in the projecting edges on the joint main body is attached to the inner surface of the joint main body at the intermediate portion a thereof for use. The axially extending elongated projections are provided along the projecting edges of the joint main body, while the depressed grooves are formed in the back of the flange edges of the packing, and the portion of the depressed groove on its surface side is constructed so as to project the appropriate thickness or predetermined distance o toward the surface side beyond the surface of the joint main body in the state in which the elongated projections are fitted in the depressed grooves, and therefore when in use, when the confronting projecting edges are tightened together by tightening the bolts, the surface sides of the depressed grooves of the packings are first brought into abutment with each other, and then the abutment surfaces are compressed the elongated projections that fit in the depressed grooves strongly and concentratedly, whereby the pipe bodies are easily and quickly connected to a secure watertight condition through simple tightening operation of the bolts and nuts.

While there has been described in connection with the preferred embodiment of the invention, it will be obvious to those skilled in the art that various changes and modifications may be made therein without departing from the invention, and it is aimed, therefore, to cover in the appended claim all such changes and modifications as fall within the true spirit and scope of the invention.

What is claimed is:

1. A corrugated pipe joint for coupling corrugated pipes including, at least two joint components, each of which comprises:

a joint main body made of a synthetic resin and including an arc-shaped portion and tightening projecting edges which are outwardly projected from circumferential end portions of said arc-shaped portion in a radial direction of said corrugated pipes to be coupled, wherein engagement projections are formed on an inner circumferential surface of each of axial end portions of said joint main body so as to be engageable with a root portion of one of said corrugated pipes, and wherein axially elongated projections and tightening bolt holes are formed on each of said tightening projecting edges; and a watertightness-implementing packing made of an elastic material and assembled with said joint main body, said watertightness-implementing packing including an arc-shaped portion and flange edges projecting outwardly from circumferentially end portions of said arc-shaped portion in the radial direction, wherein axially extending depressed grooves are formed in back sides of said flange edges so as to be fittingly engageable with said elongated projections on said joint main body respectively, wherein when said at least two joint components are coupled with one another, a surface portion of said flange edge which is disposed at a front side opposed to said depressed groove and is disposed closest to the adjacent joint component is closer to said adjacent joint component by a predetermined a distance than a surface portion of said projecting edge of said joint main body which is closest to said adjacent joint component.

2. The corrugated pipe joint as set forth in claim 1, wherein said joint component is a bisected body of a semicircular arc-shaped configuration, and wherein said semicircular arc-shaped configuration is less than 180° in a cross section.

3. The corrugated pipe joint as set forth in claim 1, wherein said corrugated pipes to be coupled are of spiral corrugated pipes, and said engagement projections formed at said axial end portions of said joint main body are extended in a spiral direction so as to allow said engagement projections to be brought into mesh engagement with root portions of said corrugated spiral pipes.

4. The corrugated pipe joint as set forth in claim 2, wherein said corrugated pipes to be coupled are of spiral corrugated pipes, and said engagement projections formed at said axial end portions of said joint main body are extended in a spiral direction so as to allow said engagement projections, to be brought into mesh engagement with root portions of said corrugated spiral pipes.

5. The corrugated pipe joint as set forth in claim 1, wherein said corrugated pipes to be coupled are of annular corrugated pipes, and said engagement projections formed at said axial end portions of said joint main body are extended in an annular direction which allows said engagement projections to be brought into mesh engagement with root portions of corrugated annular pipes.

6. The corrugated pipe joint as set forth in claim 2, wherein said corrugated pipes to be coupled are of annular corrugated pipes, and said engagement projections formed at said axial end portions of said joint main body are extended in an annular direction which allows said engagement projections to be brought into mesh engagement with root portions of corrugated annular pipes.

7. The corrugated pipe joint as set forth in claim 1, wherein said axially elongated projections are formed on cut surfaces of said projecting edges and are continuous with depressed fitting portions along an inner circumferential surface of a depressed fitting portion.

8. The corrugated pipe joint as set forth in claim 1, wherein said synthetic resin comprises one of polyolefin plastic including polyethylene and polyproplylene, thermoplastic rigid resin material including polyvinyl chloride and a resin material reinforced with glass fiber.

9. The corrugated pipe joint as set forth in claim 1, wherein said watertightness-implementing packing comprises one of natural rubber, synthetic rubber, and elastic flexible synthetic resin material.

10. The corrugated pipe joint as set forth in claim 1, wherein said joint main body and said watertightness-implementing packing comprise separately formed and bonded units.

11. The corrugated pipe joint as set forth in claim 7, wherein said tightening bolt holes are formed along a longitudinal length of said depressed portions.

12. The corrugated pipe joint as set forth in claim 7, wherein said watertightness-implementing packing is greater in thickness than a depth of said depressed fitting portion.

* * * * *